US012613643B2

(12) United States Patent (10) Patent No.: US 12,613,643 B2
Benhammadi (45) Date of Patent: Apr. 28, 2026

(54) TRANSACTION VALIDATION AND MEMORY CONFIGURATION MODIFICATION

(71) Applicant: STMicroelectronics International N.V., Geneva (CH)

(72) Inventor: Jawad Benhammadi, Pont de Claix (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/939,210

(22) Filed: Nov. 6, 2024

(65) Prior Publication Data

US 2025/0165163 A1 May 22, 2025

(30) Foreign Application Priority Data

Nov. 17, 2023 (FR) ...................................... 2312668

(51) Int. Cl.
*G06F 12/00* (2006.01)
*G06F 3/06* (2006.01)
(52) U.S. Cl.
CPC .......... *G06F 3/0622* (2013.01); *G06F 3/0637* (2013.01); *G06F 3/0673* (2013.01)

(58) Field of Classification Search
CPC .... G06F 3/0622; G06F 3/0637; G06F 3/0673; G06F 12/1433; G06F 12/1441; G06F 2212/1052; G06F 12/1483; G06F 21/79; G06F 12/0246
USPC ...................................................... 711/163
See application file for complete search history.

(56) References Cited

U.S. PATENT DOCUMENTS

| | | | |
|---|---|---|---|
| 6,952,778 B1 | 10/2005 | Snyder | |
| 2008/0276051 A1 | 11/2008 | Renno | |
| 2008/0276058 A1* | 11/2008 | Mosek | G06F 12/1441 711/163 |
| 2016/0299720 A1 | 10/2016 | Berntsen et al. | |

FOREIGN PATENT DOCUMENTS

| | | | | | |
|---|---|---|---|---|---|
| CN | 117396872 A | * | 1/2024 | ........... | G06F 3/0679 |
| WO | WO-2017022082 A1 | * | 2/2017 | ......... | G06F 12/0246 |

* cited by examiner

*Primary Examiner* — Mardochee Chery
(74) *Attorney, Agent, or Firm* — Seed IP Law Group LLP

(57) ABSTRACT

The present description concerns an operating method of a non-volatile memory, comprising the validation of a transaction, requesting a modification of a value of configuration of a sector of the memory, after comparison of the attributes of the transaction with access attributes of said sector of said memory.

13 Claims, 4 Drawing Sheets

TRANSACTION VALIDATION AND MEMORY CONFIGURATION MODIFICATION

CROSS REFERENCE TO RELATED APPLICATION(S)

This application claims the priority benefit of French patent application number FR2312668, filed on Nov. 17, 2023, entitled "Procédé de fonctionnement d'une mémoire non volatile".

TECHNICAL FIELD

The present disclosure generally concerns operating methods of a non-volatile memory as well as electronic circuits implementing these methods.

DESCRIPTION OF THE RELATED ART

Many electronic circuits, such as microcontrollers, use applications, for example boot programs, which are loaded into a non-volatile memory of the circuit. These applications may desire to configure certain sectors of the non-volatile memory. However, malicious applications may desire to modify the configuration of memory sectors linked to other applications.

BRIEF SUMMARY

There is a need to provide non-volatile memory operating methods which prevent modifications of the configuration of memory sectors by malicious applications while allowing the configuration of memory sectors all throughout the life cycle of the circuits.

An embodiment overcomes all or part of the disadvantages of known methods.

An embodiment provides an operating method of a non-volatile memory, comprising the validation of a transaction, requesting a modification of a value of configuration of a sector of the memory, after comparison of the attributes of the transaction with access attributes of said sector of said memory.

According to an embodiment, the transaction is validated when all the attributes of the transaction have a security level greater than or identical to the corresponding access attributes of said sector of said memory.

According to an embodiment, a register with an association table is configured to store said configuration value for each memory sector.

According to an embodiment, the value of a given index bit of said table corresponds to the value of configuration of a sector having the same index.

According to an embodiment, a memory interface is configured to allow or to deny a transaction according to the attributes of the transaction and to the access attributes of memory sectors.

According to an embodiment, the memory interface is configured to implement said register with an association table.

According to an embodiment, the validation of the transaction is performed by the memory interface.

According to an embodiment, the attributes of the transaction are the attributes of an application implementing said transaction.

According to an embodiment, the attributes of the transaction comprise an access restriction level, an addressing mode restriction level, and a program access prohibition level taken from among a first, a second, and a third program access prohibition levels; and the attributes of the sector comprise the access restriction level, the addressing mode restriction level, and a program access prohibition level taken from among a fourth, a fifth, and a sixth program access prohibition levels.

According to an embodiment, a transaction having an attribute corresponding to a first access restriction level can access a sector having the first or a second access restriction level; a transaction having an attribute corresponding to a first addressing mode restriction level can access a sector having a second addressing mode restriction level; a transaction having an attribute corresponding to the second access restriction level cannot access a sector having the first access restriction level; and a transaction having an attribute corresponding to a second addressing mode restriction level cannot access a sector having the first addressing mode restriction level.

According to an embodiment, a transaction having an attribute corresponding to a first program access prohibition level can access a sector having as an attribute a fourth, a fifth, or a sixth program access prohibition levels; a transaction having an attribute corresponding to a second program access prohibition level can access a sector having as an attribute the fifth and sixth protection levels but cannot access a sector having as an attribute the fourth program access prohibition level; and a transaction having an attribute corresponding to a third program access prohibition level can access a sector having as an attribute the sixth program access prohibition level but cannot access a sector having as an attribute the fourth or fifth program access prohibition levels.

According to an embodiment, the attributes of the memory sector are either the attributes of a previous transaction or default attributes defined by the first access restriction level, the second addressing mode restriction level, and the fourth program access prohibition level.

According to an embodiment, the configuration value corresponds to a cycling mode, a write-protection mode, or a write mode.

An embodiment provides an electronic circuit, comprising a non-volatile memory interface and a non-volatile memory, configured to implement the above-described method.

An embodiment provides an operating method of a non-volatile memory, wherein:

a first and a second successive transactions request a modification of a configuration value of a same memory area of said non-volatile memory, the attributes of the first transaction having a security level higher than those of the second transaction; and the second transaction is denied.

BRIEF DESCRIPTION OF THE SEVERAL VIEWS OF THE DRAWINGS

The foregoing features and advantages, as well as others, will be described in detail in the rest of the disclosure of specific embodiments given as an illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, where reference is made to absolute position qualifiers, such as "front," "back," "top," "bottom," "left," "right," etc., or relative position qualifiers, such as "top," "bottom," "upper," "lower," etc., or orientation qualifiers, such as "horizontal," "vertical," etc., reference is made unless otherwise specified to the orientation of the drawings.

Unless specified otherwise, the expressions "about," "approximately," "substantially," and "in the order of" signify plus or minus 10%, preferably of plus or minus 5%.

Figure 1:
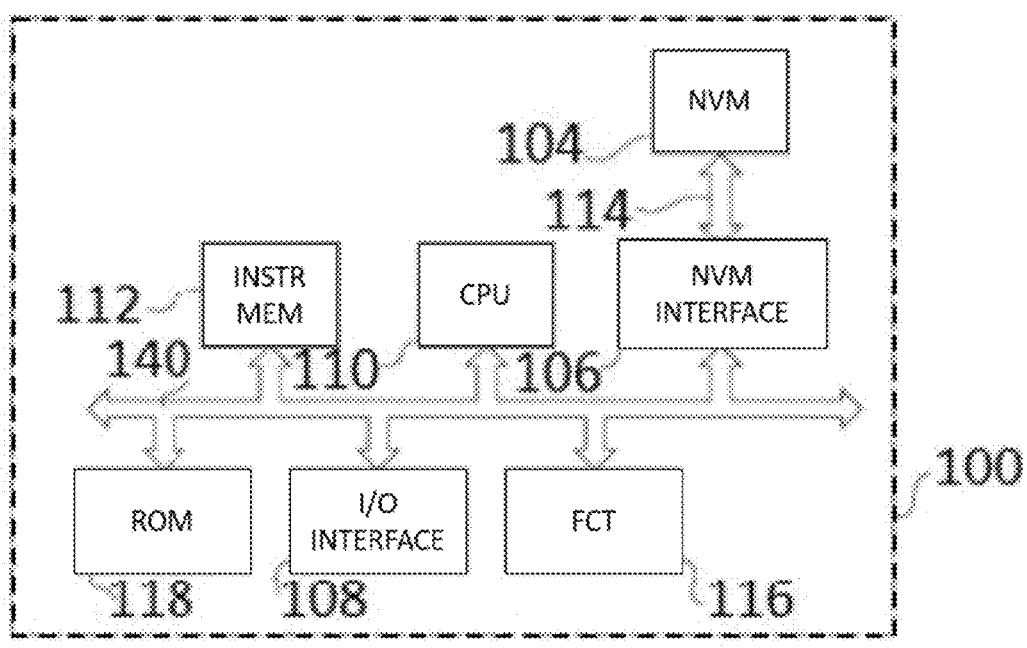
FIG. 1 shows, very schematically and in the form of blocks, an example of an integrated circuit of the type to which the described embodiments apply.

FIG. 1 shows, very schematically and in the form of blocks, an example of an integrated circuit 100 of the type to which the described embodiments apply. Circuit 100 is for example a microcontroller.

Circuit 100 comprises a non-volatile memory 104 (NVM), for example of FLASH or phase-change memory (PCM) type, capable of communicating, via a communication bus 114, with a non-volatile memory interface 106 (NVM INTERFACE) configured to write or read data into and from non-volatile memory 104.

Circuit 100 further comprises, for example, a processing unit 110 (CPU) comprising one or a plurality of processors under control of instructions stored in an instruction memory 112 (INSTR MEM). Instruction memory 112 is, for example, a volatile random access memory (RAM). Processing unit 110 and memory 112 communicate, for example, via a system (data, address, and control) bus 140. Non-volatile memory 104 is coupled to system bus 140 via non-volatile memory interface 106 and via bus 114. Device 100 further comprises an input/output interface 108 (I/O interface) coupled to system bus 140 to communicate with the outside.

Circuit 100 may integrate other circuits implementing other functions (for example, one or a plurality of volatile and/or non-volatile memories, or other processing units), symbolized by a block 116 (FCT) in FIG. 1. Among these other circuits, circuit 100 comprises, for example, a read-only or static memory 118 (ROM).

Figure 2:
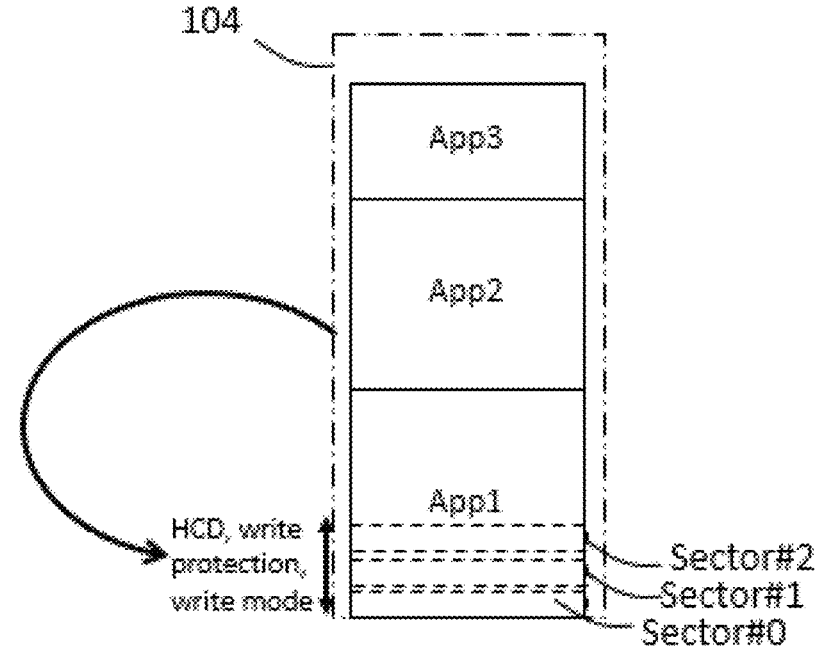
FIG. 2 shows an example of an operating method of the circuit of FIG. 1.

FIG. 2 shows an example of operating method of the circuit of FIG. 1.

More particularly, FIG. 2 shows an example of operating method of memory 104.

In the shown example, data relative to a first, a second, and a third application (App1, App2, and App3) are stored in different sectors of memory 104. Applications App1, App2, and App3 are defined with attributes including an access permission or access restriction level, a privilege level, and a program access prohibition level.

The access restriction level of an application defines, for example, the accessibility of memory areas. The privilege level of an application defines, for example, addressing mode restrictions. The program access prohibition level for example defines prohibitions on access to other applications, or on data used by the other applications.

The access to the different sectors is achieved by the implementation, by the applications, of transactions.

In an example, an application defined to have a first access restriction level (secure, Sec), has more rights than an application with a second access restriction level (non-secure, NS). The first and second access restriction levels are for example implemented with the TrustZone protocol of the ARM® CORTEX-M architecture. In an example, an application defined to have a first privilege level (privileged, Priv) has more rights than an application with a second privilege level (unprivileged, unPriv). The first and second levels are, for example, those implemented with an ARM architecture. An application implemented in the first privilege mode (Priv), in other words in the first addressing mode restriction mode, for example has its own space with physical addresses. An application implemented in the second privilege mode (unPriv), that is, in the second addressing mode restriction mode, for example has its own space with virtual addresses and cannot access other processes linked to the memory which would directly use physical addresses. In an example, an application defined with a first program access prohibition level HDPL1 has more rights than an application with a second program access prohibition level HDPL2. Similarly, an application defined with the second program access prohibition level HDPL2 has more rights than an application with a third program access prohibition level HDPL3. The program access prohibition levels HDPL1, HDPL2, and HDPL3 correspond, for example, to protection levels for successively installed boot programs, the aim being that a boot program installed afterwards cannot access a previously-installed boot program. The protection levels are for example implemented by using a monotonic counter.

In the text, a transaction implemented by an application has the same attributes as the application implementing this transaction.

The sectors of memory 104 are defined with different access attributes. These access attributes are, for example, the access permission or restriction level, the privilege level, and a program access prohibition level.

A sector may, for example, be defined with the first or the second access restriction level Sec, NS. Thus, an application defined with the second access restriction level NS cannot have access to a sector defined with the first access restriction level Sec. An application defined with the first access restriction level Sec can have access to a sector defined with the first or the second access restriction level Sec, NS.

A sector may further be defined with the first or the second privilege level Priv, unPriv. Thus, an application defined with the second privilege level unPriv cannot access a sector defined with the first privilege level Priv. An application defined with the first privilege level Priv can access an area defined with the first or with the second privilege level Priv, unPriv.

A sector may further be defined with a fourth, a fifth, or a sixth program access prohibition levels OB-HDP, HDP-EXT, non-HDP. Thus, an application defined with the first program access prohibition level HDPL1, which is for example a first boot program stage, can access a sector defined with the fourth, fifth, or sixth program access prohibition levels OB-HDP, HDP-EXT, non-HDP. An application defined with the second program access prohibition level HDPL2, which is for example a second boot program stage, can access a sector defined with the fifth or sixth protection levels HDP-EXT, non-HDP but not a sector defined with the fourth program access prohibition level OB-HDP. An application defined with the third program access prohibition level HDPL3, which is for example a third boot program stage, can access a sector defined with the sixth program access prohibition level non-HDP but not a sector defined with the fourth or fifth program access prohibition level OB-HDP, HDP-EXT.

In addition to the attributes, each sector of memory 104 is configured with one or a plurality of configuration values, stored in registers, and which for example correspond to a high cycling mode (HCD), a write protection mode, or a write mode.

In the write protection mode, the sectors having this configuration accept no write access request. They can however be read from.

In the shown example, the memory sectors of memory 104, designated with references Sector #0, Sector #1, Sector #2, are used by the first application App1.

A disadvantage of the shown example lies in the fact that the sector configuration value, written by an application having a given protection level, can be modified by an application having less permission. Thus, in an example, application App1, having program access prohibition level HDPL1, can write the configuration value of sectors Sector #0, Sector #1, Sector #2 as being HCD. Application App2, having program access prohibition level HDPL2, can for example deactivate the HCD mode of these sectors, which may result in a denial of service.

In another example, application App1, having its attributes defined with the first access restriction level Sec, the first privilege level Priv, and the program access prohibition level HDPL1, has written the configuration value of Sector #0, Sector #1, Sector #2 as being write protection. Application App2, having its attributes defined with the first access restriction level Sec, the second privilege level unPriv, and the program access prohibition level HDPL2, can for example decrease the number of sectors configured in write protection mode. This results in a modification of application App1.

Another disadvantage of the shown example is that the configuration value(s) are not available throughout the entire life cycle of the product, which is limiting.

To overcome these disadvantages, the described embodiments provide an operating method of memory 104, comprising the validation of a transaction requesting a modification of a configuration value of a sector of memory 104 after comparison of the attributes of the transaction with access attributes of said sector of said memory.

This enables to make the memory sectors available for all applications, with no compromise on safety. Further, the different configurations of the sectors remain available for all applications at each step of the life cycle of the product, for example during the customization by different subcontractors.

6

Figure 3:
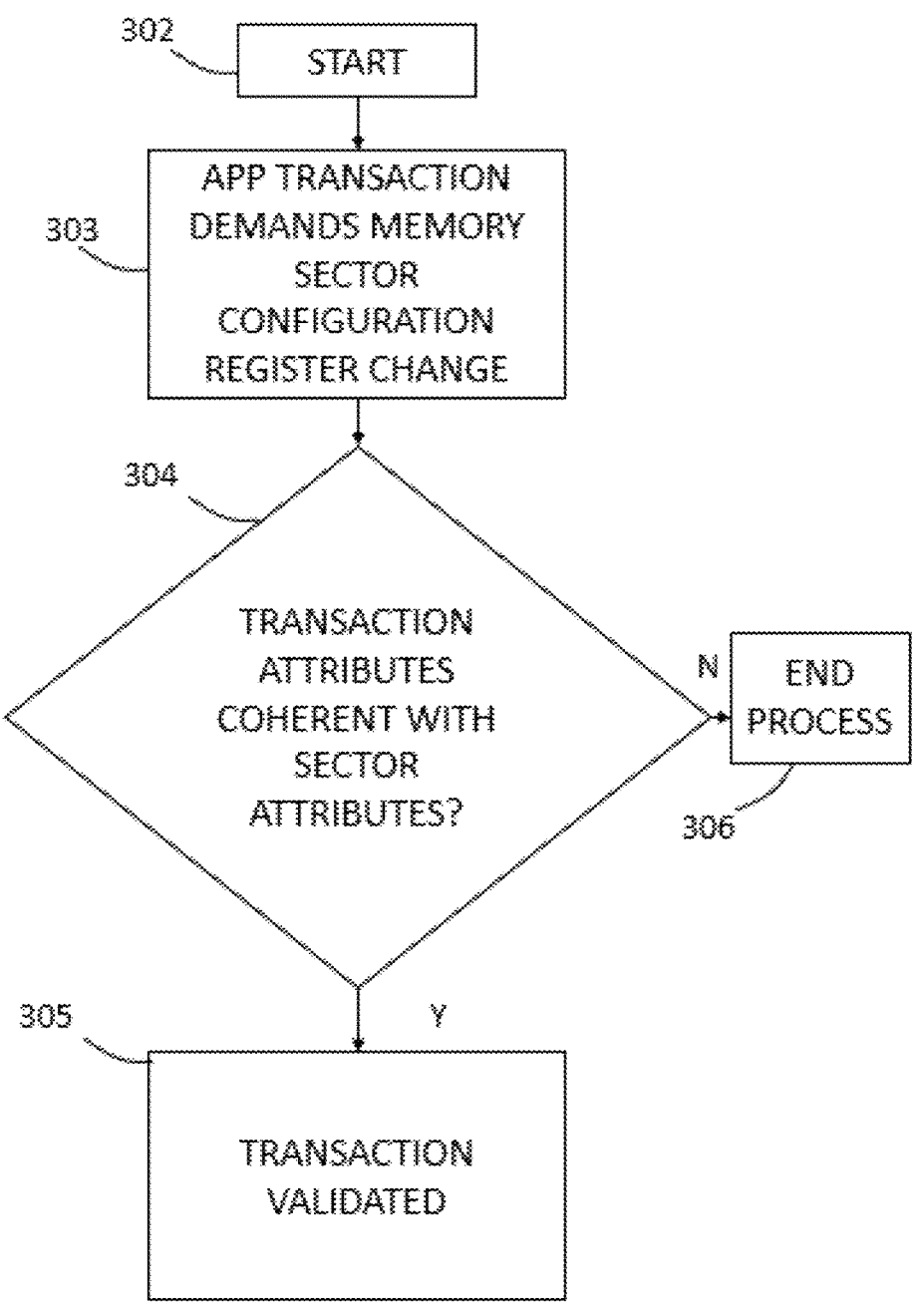
FIG. 3 shows an operating method of the circuit of FIG. 1 according to an embodiment.

FIG. 3 shows an operating method of the circuit of FIG. 1 according to an embodiment.

At a step 302 (START) the process starts.

At a next step 303 (APP TRANSACTION DEMANDS MEMORY SECTOR CONFIGURATION REGISTER CHANGE), a transaction generated by an application requests a change of the configuration value, relative to a sector for example referenced with an index "i." In other words, the transaction requests a writing into the configuration register.

In a subsequent step 304 (TRANSACTION ATTRIBUTES COHERENT WITH SECTOR ATTRIBUTES?), memory interface 106 checks the consistency between the attributes of the transaction, in other words, of the application implementing the transaction, and the access attributes of the sector of index "i." If the application issuing the transaction has permission to access the sector bearing reference "i," then the transaction is accepted (branch Y) in a subsequent step 305 (TRANSACTION VALIDATED). If the application issuing the transaction does not have permission to access the sector bearing reference "i" then the transaction is rejected (branch N) in a subsequent step 306 (END PROCESS) and an error is returned via bus 114, or there is no reaction (operation called write ignore), for example.

Steps 302 to 306 are for example carried out at any point in the life cycle of the product.

In an example, a register with an association table (bitmap register) is used to store the configuration values for each sector. In this case, the value of the bit "i" of the register of configuration values corresponds to the configuration value of the sector referenced with index "i." The implementation of the association table allows an case of implementation.

The following tables TABLE 1, TABLE 2, and TABLE 3 summarize cases where a transaction attribute has a higher security level than an access attribute of a sector "i." In other words, a transaction attribute requesting a write access to the configuration register of the sector has a security level higher than or identical to an access attribute of a sector "i" if the authorization of access to bit "i" of the configuration register of sector "i" is accepted. In other words, the attributes of the transaction have a security level greater than or identical to the access attributes of the sector when the application implementing the transaction has rights greater than or identical to the access attributes of the sector.

TABLE 1

| Attributes of the transaction requesting a write access to the sector configuration register | Authorization of the access to bit "i" of the configuration register of sector "i" |
|---|---|
| HDPL1 | Accepted for all bits and protection levels |
| HDPL2 | Accepted for bit "i" of the configuration register only if sector "i" has as an attribute the fifth or the sixth program access prohibition level HDP-EXT, non-HDP |
| HDPL3 | Accepted for bit "i" of the configuration register only if sector "i" has as an attribute the sixth non-HDP program access prohibition level |

TABLE 2

| Attributes of the transaction requesting a write access to the sector configuration register | Authorization of the access to bit "i" of the configuration register of sector "i" |
| --- | --- |
| Sec | Accepted for bit "i" of the configuration register if sector "i" has as an attribute the first or second access restriction level Sec, NS |
| NS | Accepted for bit "i" of the configuration register only if sector "i" has as an attribute the second access restriction level NS |

TABLE 3

| Attributes of the transaction requesting a write access to the sector configuration register | Authorization of the access to bit "i" of the configuration register of sector "i" |
| --- | --- |
| Priv | Accepted for bit "i" of the configuration register if sector "i" has as an attribute the first or the second privilege level Priv, unPriv |
| unPriv | Accepted for bit "i" of the configuration register only if sector "i" has as an attribute the second privilege level unPriv |

If the authorization of the access to bit "i" of the configuration register of sector "i" is not accepted in any of the three tables, then the transaction is ignored (command write ignore) or denied.

In an example, by default, the memory sectors are defined on reset by the first access restriction level (Sec), the second addressing mode restriction level (unPriv), and the fourth program access prohibition level (OB-HDP).

Figure 4:
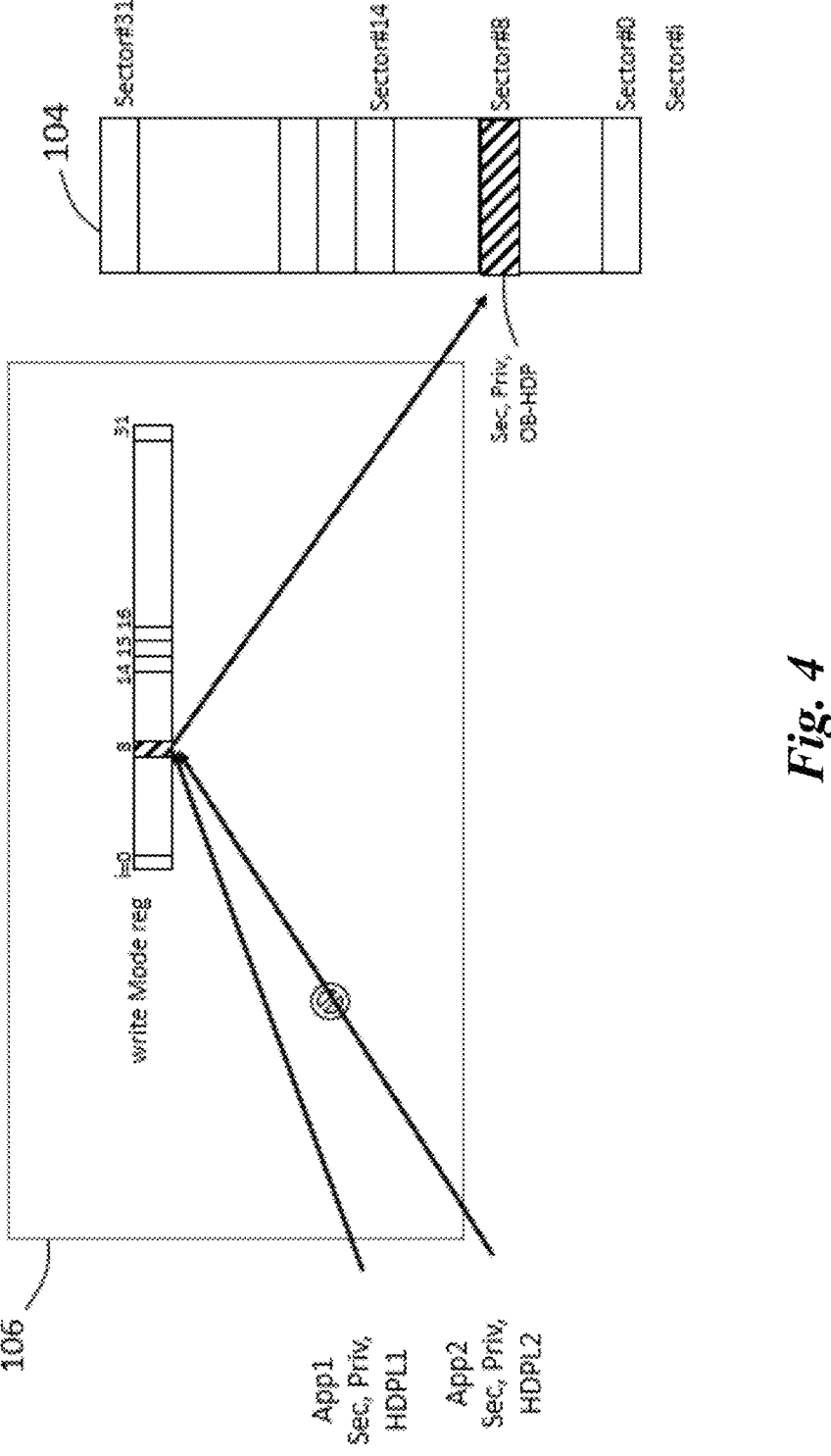
FIG. 4 shows an operating method of the circuit of FIG. 3 according to an embodiment.

FIG. 4 shows an operating method of the circuit shown of FIG. 3 according to an embodiment. More particularly, the example of FIG. 4 shows the case where application App1 has as attributes the first access restriction level Sec, the first privilege level Priv, and the first program access prohibition level HDPL1. In the shown example, application App2 has as attributes the first access restriction level Sec, the first privilege level Priv, and the second program access prohibition level HDPL2. In this example, application App1 has reserved the sector of index i=8, by using memory interface 106, and by defining it as having the first access restriction level Sec, the first privilege level Priv, and the fourth program access prohibition level OB-HDP. Application 1 configures sector 8, for example by a change of the bit of index 8 in the configuration register (write mode reg), with one of the modes among the high cycling mode HCD, the write protection mode, or a write mode. Then, in the shown example, application App2 attempts to modify the value of the bit of index 8 in the register containing configuration values write mode reg. By applying the method of FIG. 3, application App2 cannot modify the values of the configuration register at the bit of index 8, since the permission level of the transaction, in other words of application App2, does not enable it to access the sector of index 8. Indeed, application App2 has as an attribute the second program access prohibition level HDPL2, which does not provide access to sectors protected by the fourth program access prohibition level OB-HDP.

Figure 5:
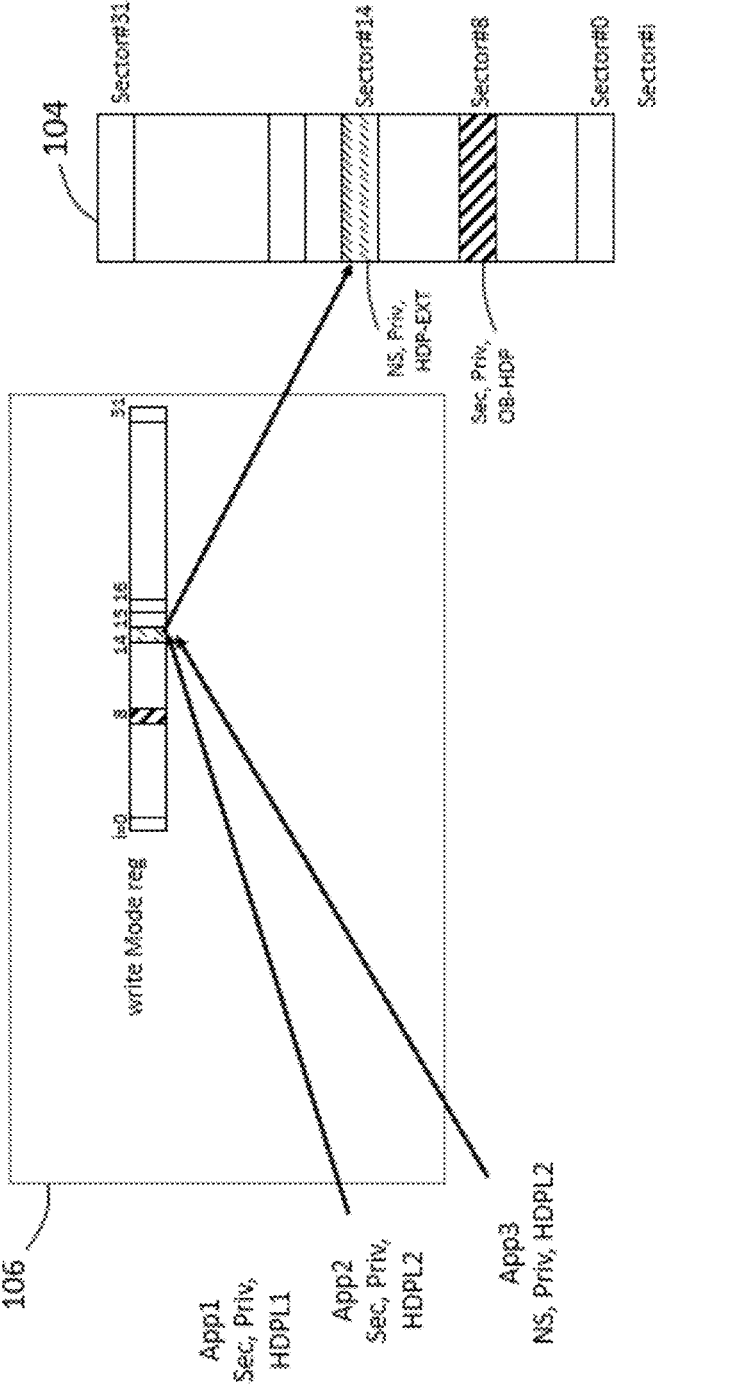
FIG. 5 shows an operating method of the circuit of FIG. 3 according to an embodiment.

FIG. 5 shows an operating method of the circuit of FIG. 3 according to an embodiment.

More particularly, the example of FIG. 5 shows the case where application App1 and application App2 are similar to the example of FIG. 4. Further, a third application App3 has as attributes the second access restriction level NS, the first privilege level Priv, and the second program access prohibition level HDPL2. In this example, application App3 has reserved the sector of index i=14, by using memory interface 106, and by defining it as having the second access restriction level NS, the first privilege level Priv, and the fifth program access prohibition level HDP-EXT. Application 3 for example configures sector 14 by a change of the bit of index 14 in the configuration register (write mode reg), with one of modes among the high cycling mode HCD, the write protection mode, or a write mode. Then, in the shown example, application App2 attempts to modify the value of the bit of index 14 in the register containing configuration values write mode reg. By applying the method of FIG. 3, application App2 is authorized by memory interface 106 to modify the values of the configuration register at the bit of index 14, in other words, the configuration values of the sector of index 14, since the permission level of the transaction, here the first access restriction mode Sec, enables it to access sectors configured with the second access restriction level NS.

Various embodiments and variants have been described. Those skilled in the art will understand that certain features of these various embodiments and variants may be combined, and other variants will occur to those skilled in the art. In particular, sector configuration values other than the configuration values corresponding to the high cycling mode HCD, to the write protection mode, or to the write mode, may be implemented.

Finally, the practical implementation of the described embodiments and variants is within the abilities of those skilled in the art based on the functional indications given hereabove. In particular, even though the disclosed examples use a register with an association table, it is possible to implement the method of FIG. 3 with no association table, to the detriment, however, of a simplicity of implementation.

Operating method of a non-volatile memory, can be summarized as including the validation of a transaction, requesting a modification of a value (HCD, Write protection, write mode) of configuration of a sector of the memory, after comparison of the attributes of the transaction with access attributes of said sector of said memory.

The transaction can be validated when all the attributes of the transaction have a security level greater than or identical to the corresponding access attributes of said sector of said memory.

A register with an association table can be configured to store said configuration value for each sector of the memory.

The value of a bit of given index of said table can correspond to the value of configuration of a sector having the same index.

A memory interface (106) can be configured to authorize or to deny a transaction according to the attributes of the transaction and to the attributes of access to sectors of the memory.

The memory interface (106) can be configured to implement said register (write mode reg) with an association table.

The validation of the transaction can be performed by the memory interface (106).

The attributes of the transaction can be the attributes of an application (App1, App2, App3) implementing said transaction.

The attributes of the transaction can include an access restriction level (Sec, NS), an addressing mode restriction level (Priv, unPriv), and a program access prohibition level selected from among a first, a second, and a third program access prohibition levels (HDPL1, HDPL2, HDPL3); and the attributes of the sector can include the access restriction level (Sec, NS), the addressing mode restriction level (Priv, unPriv), and a program access prohibition level taken from among a fourth, a fifth, and a sixth program access prohibition levels (OB-HDP, HDP-EXT, non-HDP).

A transaction having an attribute corresponding to a first access restriction level (Sec) can access a sector having the first or a second access restriction level (Sec, NS); a transaction having an attribute corresponding to a first addressing mode restriction level (Priv) can access a sector having a second addressing mode restriction level (unPriv); a transaction having an attribute corresponding to the second access restriction level (NS) cannot access a sector having the first access restriction level (Sec); and a transaction having an attribute corresponding to a second addressing mode restriction level (unPriv) cannot access a sector having the first addressing mode restriction level (Priv).

A transaction having an attribute corresponding to a first program access prohibition level (HDPL1) can access a sector having as an attribute a fourth, a fifth, or a sixth program access prohibition level (OB-HDP, HDP-EXT, non-HDP); a transaction having an attribute corresponding to a second program access prohibition level (HDPL2) can access a sector having as an attribute the fifth and the sixth protection levels (HDP-EXT, non-HDP), but cannot access a sector having as an attribute the fourth program access prohibition level (OB-HDP); and a transaction having an attribute corresponding to a third program access prohibition level (HDPL3) can access a sector having as an attribute the sixth program access prohibition level (non-HDP), but cannot access a sector having as an attribute the fourth or the fifth program access prohibition levels (OB-HDP, HDP-EXT).

The attributes of the memory sector can be either the attributes of a previous transaction or default attributes defined by the first access restriction level (Sec), the second addressing mode restriction level (unPriv), and the fourth program access prohibition level (OB-HDP).

The configuration value can correspond to a cycling mode (HCD, power mode, user mode), a write protection mode, or a write mode.

Electronic circuit (100), can be summarized as including a non-volatile memory interface (106) and a non-volatile memory (104), configured to implement the method according to any of the foregoing claims.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An operating method of a non-volatile memory, comprising:
    after comparison of attributes of a transaction with access attributes of a sector of the memory:
    validating the transaction; and
    requesting a modification of a value of configuration of the sector of the memory;
    wherein:
        the attributes of the transaction comprise an access restriction level, an addressing mode restriction level, and a program access prohibition level selected from a first set of levels including a first, a second, and a third program access prohibition levels; and
        the attributes of the sector comprise the access restriction level, the addressing mode restriction level, and a program access prohibition level selected from a second set of levels including a fourth, a fifth, and a sixth program access prohibition levels.

2. The method according to claim 1, wherein the transaction is validated when all the attributes of the transaction have a security level greater than or identical to the corresponding access attributes of the sector of the memory.

3. The method according to claim 1, wherein a register with an association table is configured to store a respective value of configuration for each sector of the memory.

4. The method according to claim 3, wherein a value of a bit of an index of the table corresponds to the value of configuration of a sector having the index.

5. The method according to claim 1, wherein a memory interface is configured to authorize or to deny the transaction according to the attributes of the transaction and attributes of access to sectors of the memory.

6. The method according to claim 5, wherein the memory interface is configured to implement a register with an association table.

7. The method according to claim 5, wherein validating the transaction is performed by the memory interface.

8. The method according to claim 1, wherein the attributes of the transaction are attributes of an application implementing the transaction.

9. The method according to claim 1, wherein:
    a transaction having an attribute corresponding to a first access restriction level can access a sector having the first or a second access restriction level;
    a transaction having an attribute corresponding to a first addressing mode restriction level can access a sector having a second addressing mode restriction level;
    a transaction having an attribute corresponding to the second access restriction level cannot access a sector having the first access restriction level; and
    a transaction having an attribute corresponding to a second addressing mode restriction level cannot access a sector having the first addressing mode restriction level.

10. The method according to claim 1, wherein:
    a transaction having an attribute corresponding to the first program access prohibition level can access a sector having as an attribute the fourth, the fifth, or the sixth program access prohibition level;
    a transaction having an attribute corresponding to the second program access prohibition level can access a sector having as an attribute the fifth and the sixth protection levels, but cannot access a sector having as an attribute the fourth program access prohibition level; and a transaction having an attribute corresponding to the third program access prohibition level can access a sector having as an attribute the sixth program access prohibition level, but cannot access a sector having as an attribute the fourth or the fifth program access prohibition levels.

11. The method according to claim 10, wherein the attributes of the memory sector are either the attributes of a previous transaction or default attributes defined by the first access restriction level, the second addressing mode restriction level, and the fourth program access prohibition level.

12. The method according to claim 1, wherein the value of configuration corresponds to a cycling mode, a write protection mode, or a write mode.

13. An electronic circuit, comprising a non-volatile memory interface and a non-volatile memory, configured to implement the method according to claim 1.

\*　\*　\*　\*　\*